(12) United States Patent
Matsunaga et al.

(10) Patent No.: US 7,613,204 B2
(45) Date of Patent: Nov. 3, 2009

(54) COMMUNICATION TIMING CONTROL METHOD AND APPARATUS, NODE, AND COMMUNICATION SYSTEM

(75) Inventors: Toshihiko Matsunaga, Osaka (JP); Shigeru Fukunaga, Hyogo (JP); Masaaki Date, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 702 days.

(21) Appl. No.: 11/214,903

(22) Filed: Aug. 31, 2005

(65) Prior Publication Data
US 2006/0050727 A1 Mar. 9, 2006

(30) Foreign Application Priority Data
Sep. 3, 2004 (JP) ............................. 2004-257533

(51) Int. Cl.
*H04L 12/413* (2006.01)
(52) U.S. Cl. ....................................... 370/445; 370/447
(58) Field of Classification Search ................. 370/431, 370/445, 447, 448, 458, 462, 442
See application file for complete search history.

(56) References Cited

U.S. PATENT DOCUMENTS

| | | | | | |
|---|---|---|---|---|---|
| 4,706,246 | A | * | 11/1987 | Kume | ........................ 370/445 |
| 4,809,264 | A | * | 2/1989 | Abraham et al. | ............ 370/489 |
| 5,012,467 | A | * | 4/1991 | Crane | ........................ 370/445 |
| 5,825,749 | A | * | 10/1998 | Terayama et al. | ............ 370/244 |
| 5,917,629 | A | * | 6/1999 | Hortensius et al. | ............ 398/99 |
| 6,205,153 | B1 | * | 3/2001 | Shaffer et al. | ............... 370/445 |
| 6,923,380 | B2 | * | 8/2005 | Nakabe et al. | .............. 235/492 |

OTHER PUBLICATIONS

Waiyaresu LAN Akitekucha (Wireless LAN Architecture) edited by Matsushita et al., Kyoritsu Shuppan, 1996, pp. 47-71.

* cited by examiner

*Primary Examiner*—William Trost, IV
*Assistant Examiner*—Toan D Nguyen
(74) *Attorney, Agent, or Firm*—Venable LLP; Michael A. Sartori; Justine A. Gozzi

(57) ABSTRACT

Each node in a communication system transmits and receives state variable signals indicating internal node states or timings, generates transitions in its internal state or timing at a basic rate but at timings adjusted according to the received state variable signals, transmits data in time slots synchronized to the output state variable signals, receives data signals from the other nodes, detects collisions between the received data signals, and changes the timing of its time slots when a collision is detected, by shifting the phase of the transitions, or by inserting additional dummy transitions and transmitting corresponding dummy output state variable signals. The nodes can thereby assign their own time slots and avoid collisions autonomously.

16 Claims, 12 Drawing Sheets

COMMUNICATION TIMING CONTROL METHOD AND APPARATUS, NODE, AND COMMUNICATION SYSTEM

BACKGROUND OF THE INVENTION

1. Field of the Invention

The present invention relates to a communication timing control method, a communication timing control apparatus, a node, and a communication system, more particularly to a method of avoiding data transmission collisions in a communication system including nodes that cannot communicate with each other directly because of intervening obstacles or the like.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, %i Waiyaresu LAN Akitekucha (Wireless LAN Architecture), edited by Matsushita and Nakagawa, Kyoritsu Shuppan, 1996, pp. 47, 53-59, and 69 (in Japanese).

In the CSMA methods, a node with data to transmit determines whether other nodes are transmitting by sensing their carrier signals, and waits until no other node is transmitting before transmitting itself. The CSMA methods have the disadvantage of severely restricting the number of channels that can be used simultaneously.

In the TDMA method, different time slots are assigned to different nodes, and each node transmits data in its own assigned time slot. TDMA can provide more simultaneous communication channels than CSMA, but when the set of communicating nodes changes dynamically, an administrative node must reassign the time slots dynamically. A weakness of the TDMA system is that if the administrative node malfunctions, the entire communication system may be brought down. The process by which time slots are assigned dynamically to nodes is also complex, making it difficult to respond promptly to changing conditions. A further problem is that the width of the time slots cannot be changed to accommodate changing amounts of data transmission.

Some of these problems with the TDMA system can be overcome by providing administrative functions in each node and having the nodes assign their own time slots through a negotiation process, but conventional TDMA systems of this type have encountered problems when some of the nodes cannot communicate with each other because of intervening obstacles or the like. Specifically, data transmitted from two nodes that cannot communicate with each other may collide at a third node because the two nodes do not know each other's transmission timing.

It would be desirable to have a flexible and autonomous method and apparatus for controlling communication timing, so that each node could communicate effectively without having to receive timing control instructions from an administrative node, and it would be desirable for this method and apparatus to avoid data collisions despite the presence of obstacles or other obstructions to communication between certain nodes.

SUMMARY OF THE INVENTION

The present invention provides a method of controlling communication timing in a communication system having a plurality of nodes. At an arbitrary node in the communication system, the method includes (1) receiving input state variable signals from at least two other nodes in the communication system; (2) generating transitions in the internal operating state or operating timing at the arbitrary node; (3) transmitting output state variable signals in synchronization with the transition timings; (4) transmitting data in time slots synchronized to the output state variable signals; (5) receiving data signals from the other nodes; (6) detecting collisions between the received data signals; and (7) changing the timing of the time slots when a collision is detected.

The output state variable signals indicate an operating state or operating timing of the arbitrary node. The input state variable signals indicate operating states or operating timings of the other nodes. The transitions occur at a basic transition rate, but at timings adjusted according to the input state variable signals. The timing of the time slots can be changed by shifting the phase of the transitions, for example, thereby shifting the phase of the output state variable signals, or by inserting additional dummy transitions and transmitting corresponding dummy output state variable signals.

The invention also provides a communication timing control apparatus that employs the invented method, a communication node including the invented communication timing control apparatus, and a communication system comprising a plurality of communication nodes, each communication node including the invented communication timing control apparatus.

DETAILED DESCRIPTION OF THE INVENTION

Figure 1:
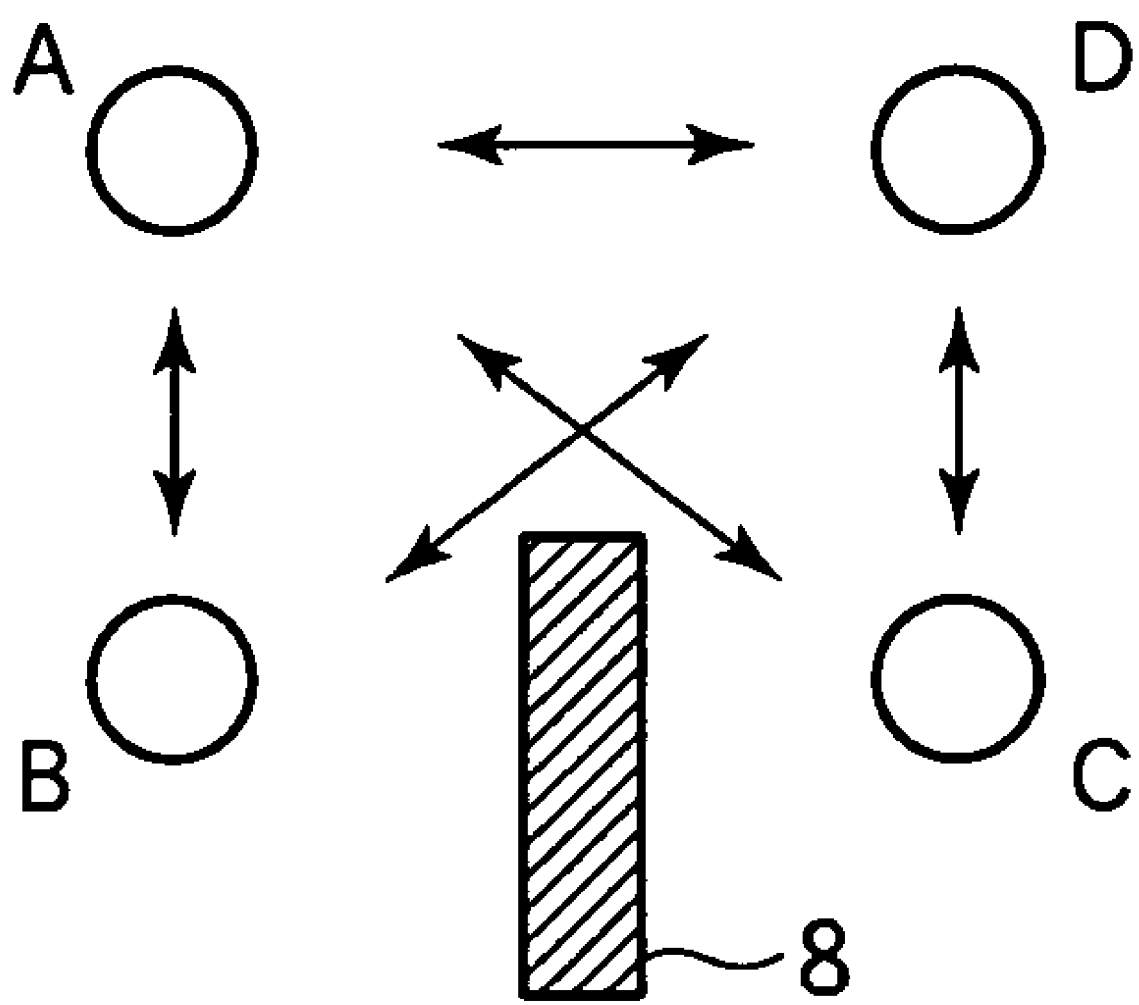
FIG. 1 shows a network to which the first three embodiments apply.

Embodiments of the invention will now be described with reference to the attached drawings, in which like elements are indicated by like reference characters.

Referring to FIG. 1, the communication system in the first three embodiments is a network comprising four nodes A, B, C, D that transmit data and impulse signals to each other. The nodes may have fixed locations or be mobile. Each pair of nodes can communicate with each other directly except for the pair consisting of nodes B and C, which are prevented from communicating directly by an intervening obstacle 8.

FIRST EMBODIMENT

Figure 2:
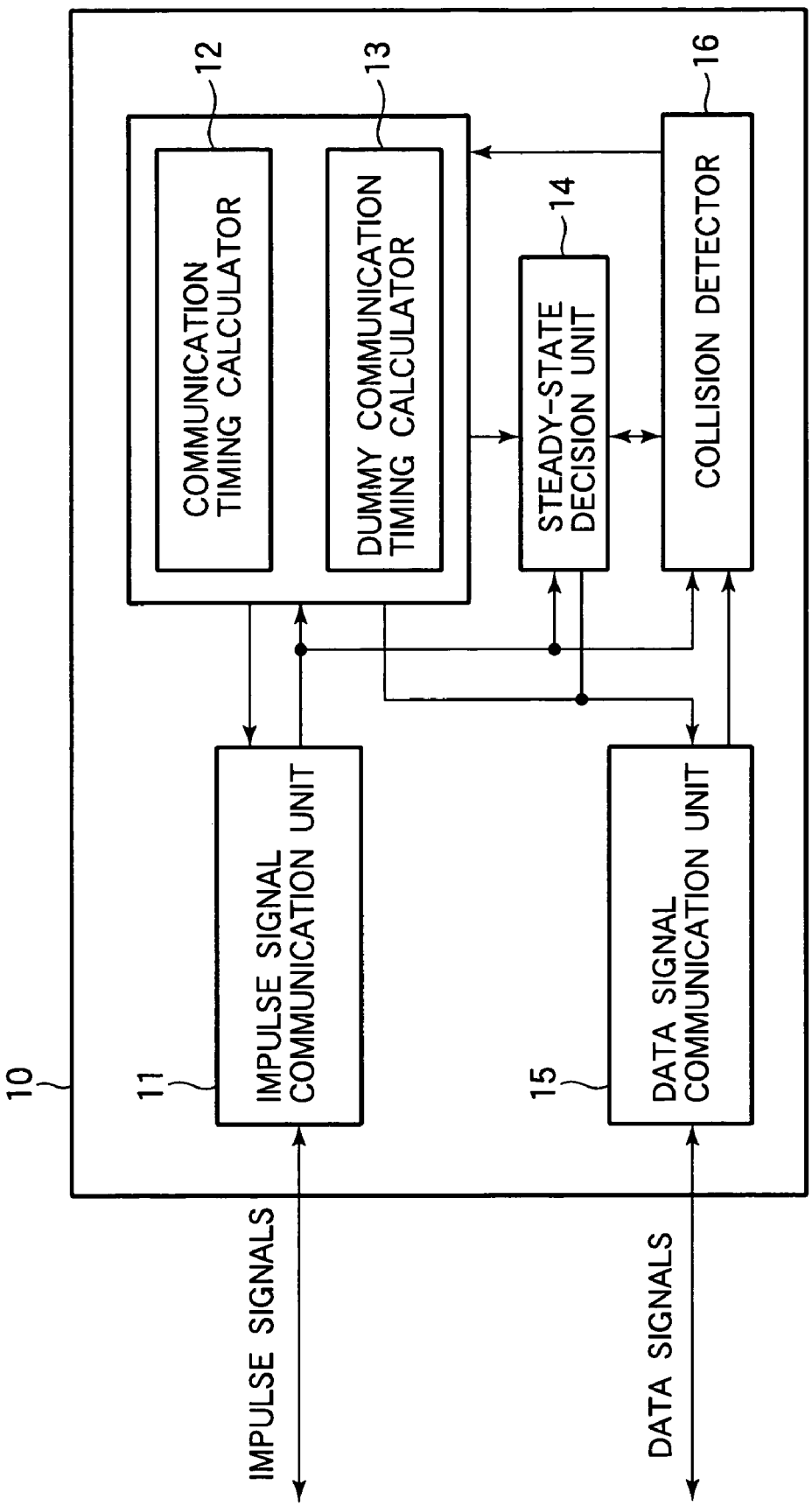
FIG. 2 is a functional block diagram showing the internal structure of a node in the first embodiment.

Referring to FIG. 2, each node 10 in the first embodiment comprises a state variable signal communication unit or impulse signal communication unit 11, a timing decision unit or communication timing calculator 12, a dummy communication timing calculator 13, a steady-state decision unit 14, a data signal communication unit 15, and a collision detector 16. The impulse signal communication unit 11, communication timing calculator 12, dummy timing decision unit or dummy communication timing calculator 13, steady-state decision unit 14, and collision detector 16 combine to function as a communication timing control apparatus.

The impulse signal communication unit 11 receives impulse signals transmitted by neighboring nodes. Two nodes are considered to be neighboring if they are within receiving range of each other's impulse signals. An impulse signal is a timing signal, not including a destination address. The impulse signal may have, for example, a Gaussian waveshape. The impulse signal communication unit 11 sends each received impulse signal, or a reshaped version of the impulse signal, or a signal generated from the received impulse signal, to the communication timing calculator 12, dummy communication timing calculator 13, and steady-state decision unit 14.

The impulse signal communication unit 11 also has an impulse transmission function. The impulse signal communication unit 11 transmits output impulse signals according to a first phase signal $\theta_{i1}(t)$ received from the communication timing calculator 12, by transmitting an output impulse signal when the first phase signal $\theta_{i1}(t)$ takes on a specific value $\alpha$ ($0 \leq \alpha < 2\pi$). It is desirable for a particular value of $\alpha$ (e.g., $\alpha=0$) to be uniformly set for the entire system. The impulse signal communication unit 11 also transmits output impulse signals according to a second phase signal $\theta_{i2}(t)$ received from the dummy communication timing calculator 13, by transmitting an output impulse signal when the second phase signal $\theta_{i2}(t)$ takes on the specific value $\alpha$ ($0 \leq \alpha < 2\pi$).

The communication timing calculator 12 and the dummy communication timing calculator 13 operate nearly identically. The communication timing calculator 12 operates both before and after the collision detector 16 detects a collision. The dummy communication timing calculator 13 operates only after the collision detector 16 detects a collision, operating in general for the duration of the condition that caused the collision. During this period, when the communication timing calculator 12 and dummy communication timing calculator 13 operate simultaneously, they treat each other's phase signals as if they represented the timing of impulse signals at different nodes. These are the only differences between the communication timing calculator 12 and dummy communication timing calculator 13, so the description given below applies to both the communication timing calculator 12 and dummy communication timing calculator 13, and the symbol $\theta_i(t)$ will be used to represent either the first phase signal $\theta_{i1}(t)$ or the second phase signal $\theta_{i2}(t)$.

The phase signal $\theta_i(t)$ output by the communication timing calculator 12 or dummy communication timing calculator 13 advances at a basic rate that is adjusted according to the impulse signals received from other nodes according to equation (1) below, in which the variable t represents time and N is the number of neighboring nodes. When the communication timing calculator 12 and dummy communication timing calculator 13 operate simultaneously, N also includes the i-th node itself. This equation models a type of nonlinear oscillation. The invention is not limited to the use of this particular model; other equations that model nonlinear oscillation may be used instead. The phase value may be regarded as a state variable of the node, and an impulse signal transmitted in synchronization with the phase signal $\theta_i(t)$ may be regarded as a state variable signal.

$$\frac{d\theta_i(t)}{dt} = \omega + \sum_{k=1}^{N} P_k(t) \cdot R(\theta_i(t), \sigma(t)) \quad (1)$$

$$R(\theta_i(t), \sigma(t)) = \sin(\theta_i(t) + \sigma(t)) \quad (2)$$

$$\sigma(t) = \pi + \phi(t)$$

$\theta_i(t)$: phase signal at node i $\omega$: natural angular frequency parameter $P_k(t)$: impulse signal received from another node, or transmitted on the basis of a different phase signal $R(\theta_i(t) \sigma(t))$: phase response function $\phi(t)$: random noise function Equation (1) is essentially a rule for generating a timing cycle with a natural angular frequency expressed by the parameter $\omega$, and adjusting the phase of the timing cycle according to transmitted and received impulse signals, which are expressed by the function $P_k(t)$. For an impulse signal received from another node, $P_k(t)$ expresses the value at time t of the output of the impulse signal communication unit 11 to the communication timing calculator 12 or dummy communication timing calculator 13. When the communication timing calculator 12 and dummy communication timing calculator 13 operate simultaneously, in the communication timing calculator 12 $P_k(t)$ may also express an impulse signal transmitted to other nodes on the basis of the phase signal $\theta_{i2}(t)$ generated by the dummy communication timing calculator 13, and in the dummy communication timing calculator 13, $P_k(t)$ may also express in impulse signal transmitted to other nodes on the basis of the phase signal $\theta_{i1}(t)$ generated by the communication timing calculator 12.

The function $R(\theta_i(t), \sigma(t))$ is a phase response function that adjusts the phase of the timing cycle in response to the N impulse signals $P_k(t)$. The phase response function $R(\theta_i(t), \sigma(t))$ and may be defined as in, for example, equation (2), which adds random noise in complementary phase to the phase value $\theta_i(t)$.

Equations (1) and (2) have a nonlinear operating characteristic that acts as a repulsion rule by attempting to separate the phases of interacting timing cycles. The constant term $\pi$ in equation (2) attempts to establish a complementary phase relationship between different timing cycles. The random noise function $\phi(t)$ gives the nonlinear characteristic a random variability by generating noise (random values) according to, for example, a Gaussian probability distribution with a mean value of zero. The random variability is added to keep the system from becoming trapped in a locally stable state (local solution) other than the desired stable state (optimal solution).

The phase response function $R(\theta_i(t), \sigma(t))$ in equation (2) above is a sine function, but the invention is not limited to the use of a sine function, and the constant term is not limited to $\pi$. The constant term may be any constant $\lambda$ other than zero or an even multiple of $\pi$ (e.g., any value in the range $0<\lambda<2\pi$). If a constant other than $\pi$ is used, the result will be that two interacting timing cycles tend to assume different but not reverse phases.

Figure 3A:
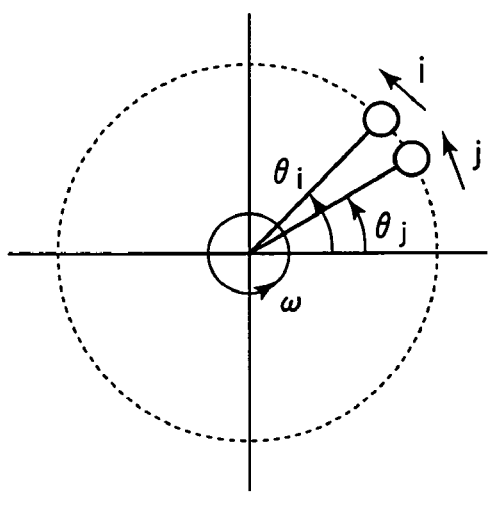
FIG. 3A illustrates an initial state during communication among two nodes in the first embodiment.
Figure 3A:
Figure 3B:
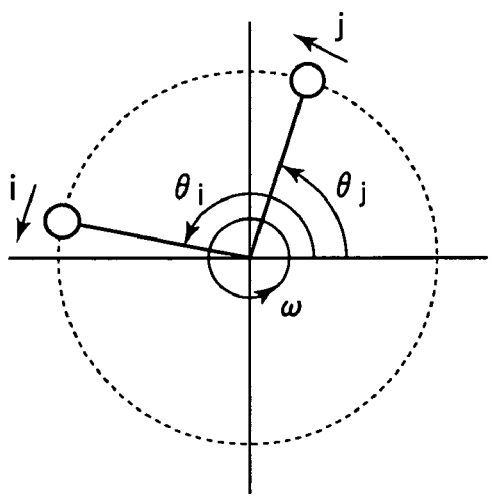
FIG. 3B illustrates a transitional state during communication among the two nodes.
Figure 3B:
Figure 3C:
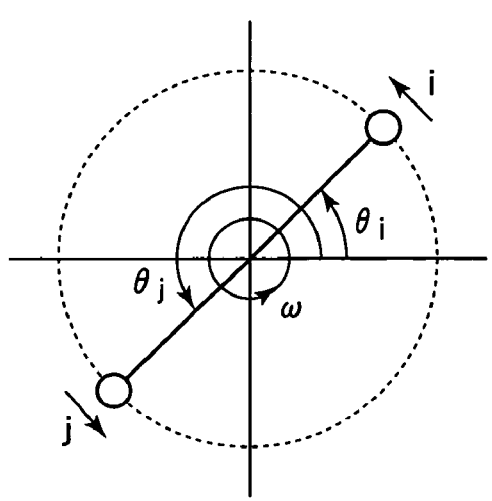
FIG. 3C illustrates the steady state during communication among the two nodes.

FIGS. 3A, 3B, and 3C illustrate this process when there is just one neighboring node j near the node of interest i. FIG. 3A shows an exemplary initial state, when the system starts operating. Nonlinear oscillation is modeled by the motion of the two point masses rotating around a circle, expressing the timing phase of these nodes i, j. If the rotational motion of a point mass is projected onto the vertical axis or horizontal axis, the motion of the projected point exhibits harmonic nonlinear oscillation. From equations (1) and (2), a nonlinear characteristic operating on the two mass points attempts to bring them into complementary phases, so with elapse of time the initial state in FIG. 3A passes through a transitional state such as the one in FIG. 3B and finally settles into the steady state shown in FIG. 3C.

The two point masses rotate with a basic angular velocity (equivalent to the basic rate of transitions in the operating states of their nodes) given by the natural angular frequency parameter $\omega$. The point masses interact by transmission and reception of output impulse signals, alter (quicken or slow) their angular velocities as a result of the interaction, and reach a steady state in which a complementary phase relationship is maintained. This process can be understood as operating by mutual repulsion of the two point masses as they rotate.

Figure 4A:
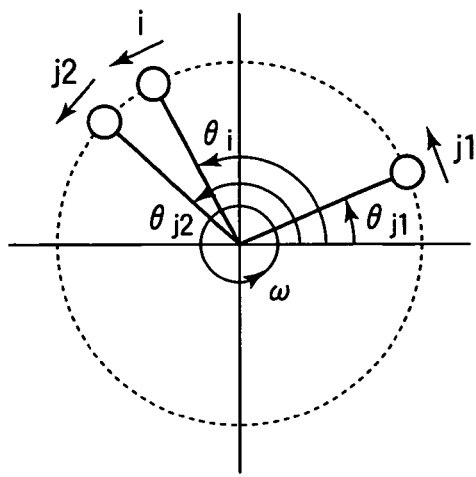
FIG. 4A illustrates an initial state during communication among three nodes in the first embodiment.
Figure 4B:
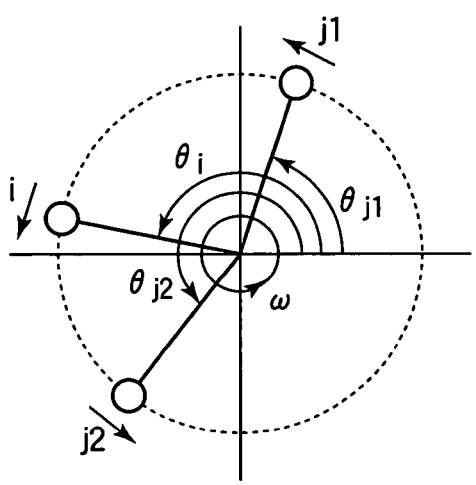
FIG. 4B illustrates a transitional state during communication among the three nodes.
Figure 4C:
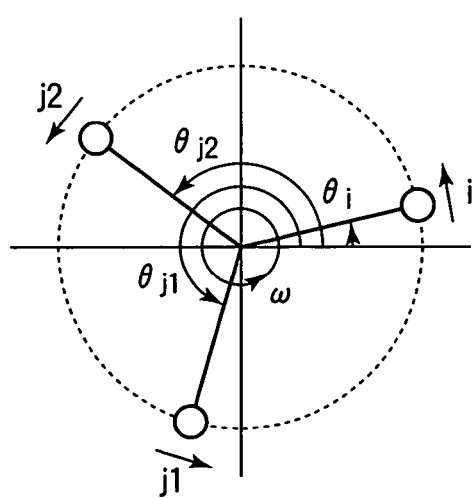
FIG. 4C illustrates the steady state during communication among the three nodes.

In FIGS. 4A, 4B, and 4C there are two neighboring nodes j1 and j2 near the node of interest i. FIG. 4A shows an exemplary initial state, FIG. 4B shows a transitional state, and FIG. 4C shows the steady state in which the phases at the three nodes are mutually separated by $2\pi/3$ radians. This state can also be thought of as being reached by mutual repulsion of point masses rotating around a circle. Similar operations occur when the number of neighboring nodes is three or more.

If the number of neighboring nodes changes during the course of system operation, the steady state changes adaptively. Assume, for example, that there is now one node neighboring the node of interest, and that a stable phase relationship has been established as in FIG. 3C. Then assume that one new neighboring node is added. The stability of the phase relationship is destroyed, but after passing through a transitional state, the system assumes a new steady state in which there are two neighboring nodes, as in FIG. 4C. Similar adaptation occurs when two or more new neighboring nodes are added, or when a neighboring node is removed or stops functioning.

The communication timing calculator 12 outputs the first phase signal $\theta_{i1}(t)$ to the impulse signal communication unit 11, steady-state decision unit 14, and data signal communication unit 15. The dummy communication timing calculator 13 outputs the second phase signal $\theta_{i2}(t)$ likewise to the impulse signal communication unit 11, steady-state decision unit 14, and data signal communication unit 15.

The steady-state decision unit 14 decides whether the transmission timings of the output impulse signals at its own node and one or more neighboring nodes are in a transitional state (as in FIG. 3B or 4B) or the steady state (as in FIG. 3C or 4C). The steady-state decision unit 14 observes the timing of the impulse signals received from other nodes and the timing of the output impulse signals transmitted from its own node, and decides that they are in the steady state if the timing differences remain constant, or nearly constant, over time. The steady-state decision unit 14 acquires the timing of the impulse signals transmitted from its own node by receiving the first and second phase signals $\theta_{i1}(t)$ and $\theta_{i2}(t)$.

The steady-state decision unit 14 can make the steady-state decision by performing the following steps (a) to (d) in synchronization with the first phase signal $\theta_{i1}(t)$. These steps may also be synchronized with the second phase signal $\theta_{i1}(t)$, or the second phase signal $\theta_{i2}(t)$ may be treated as if it represented an impulse signal from another node. In the latter case, the notation $\theta_i(t)$ in the following description represents only the first phase signal $\theta_{i1}(t)$.

(a) The value $\beta$ of the phase signal $\theta_i(t)$ at the timing of the arrival of each received impulse signal from the impulse signal receiving unit 11, and the timing of each output impulse signal transmitted by the impulse signal transmitter 13, other than impulse signals generated from phase signal $\theta_i(t)$, is observed for one period of phase signal $\theta_i(t)$. Let the N observed values $\beta$ of the phase signals $\theta_i(t)$ be:

$$\beta_1, \beta_2, \ldots, \beta_N (0<\beta_1<\beta_2<\ldots<\beta_N<2\pi)$$

(b) The differences (phase differences) $\Delta$ between adjacent values are calculated from the observed values $\beta$ of the phase signals $\theta_i(t)$.

$$\Delta_1=\beta_1, \Delta_2=\beta_2-\beta_1, \ldots, \Delta_N=\beta_N-\beta_{N-1}$$

(c) Processes (a) and (b) above are carried out at intervals of one period of the phase signal $\theta_i(t)$ and the rate of change $\gamma$ (differences) in the phase difference $\Delta$ between adjacent periods is calculated.

$$\gamma_1=\Delta_1(\tau+1)-\Delta_1(\tau), \gamma_2=\Delta_2(\tau+1)-\Delta_2(\tau), \ldots, \gamma_N=\Delta_N(\tau+1)-\Delta_N(\tau)$$

where $\tau$ indicates discrete time in units of one period of the phase signal $\theta_i(t)$.

(d) The steady state is recognized when the above rates of change $\gamma$ are all smaller than a predetermined value $\epsilon$.

$$\gamma_1<\epsilon, \gamma_2<\epsilon, \ldots, \gamma_N<\epsilon$$

It is also possible, however, to make the steady state decision according to whether the decision condition $$\gamma_1<\epsilon, \gamma_2<\epsilon, \ldots, \gamma_N<\epsilon$$

is satisfied over M periods (where M is an integer greater than two). The larger the value of M is, the more stable the state must be in order for the steady-state decision unit 14 to decide that the steady state has been reached. Alternatively, the decision may be based on only some of the received impulse signals.

At intervals equal to one period of the phase signal $\theta_i(t)$, the steady-state decision unit 14 sends the data signal communication unit 15 a steady-state decision signal indicating the decision result, and a slot signal equal to the first observed phase value $\beta_1$ in the current cycle of the phase signal $\theta_i(t)$.

The data signal communication unit 15 receives data transmitted by other nodes and transmits data originating at or relayed by its own node. When the steady-state decision signal indicates that the steady state has been recognized, the data signal communication unit 15 transmits data in a time slot as described below. (The term 'time slot' will be used even though it does not indicate a fixed time interval allocated by the system.) When the steady-state decision signal indicates a transitional state, the data signal communication unit 15 does not transmit data.

The natural angular frequency parameter $\omega$ has a uniform predetermined value throughout the communication system. This facilitates rapid convergence to the steady state.

The collision detector 16 decides whether data signals received from other nodes have collided, or might have collided.

The structure that basically enables the work of assigning the time slots to be distributed over autonomous nodes comprises the impulse signal communication unit 11, communication timing calculator 12, steady-state decision unit 14, and data signal communication unit 15. The reason for adding the dummy communication timing calculator 13 and collision detector 16 to this structure is as follows.

If the time slots are given their maximum width, then after transmitting an output impulse signal, a node can transmit its data signal until just before the next node transmits an impulse signal. If this timing is followed, data signals can be transmitted and received within the propagation range of the signals without collisions (as in FIG. 3C or 4C).

A hidden node problem, however, may arise because of intervening obstacles or the like. This occurs, for example, in the network comprising nodes A, B, C, D in FIG. 1, in which node A interacts with all three of the other nodes B, C, D, but node B is hidden from node C.

Figure 5A:
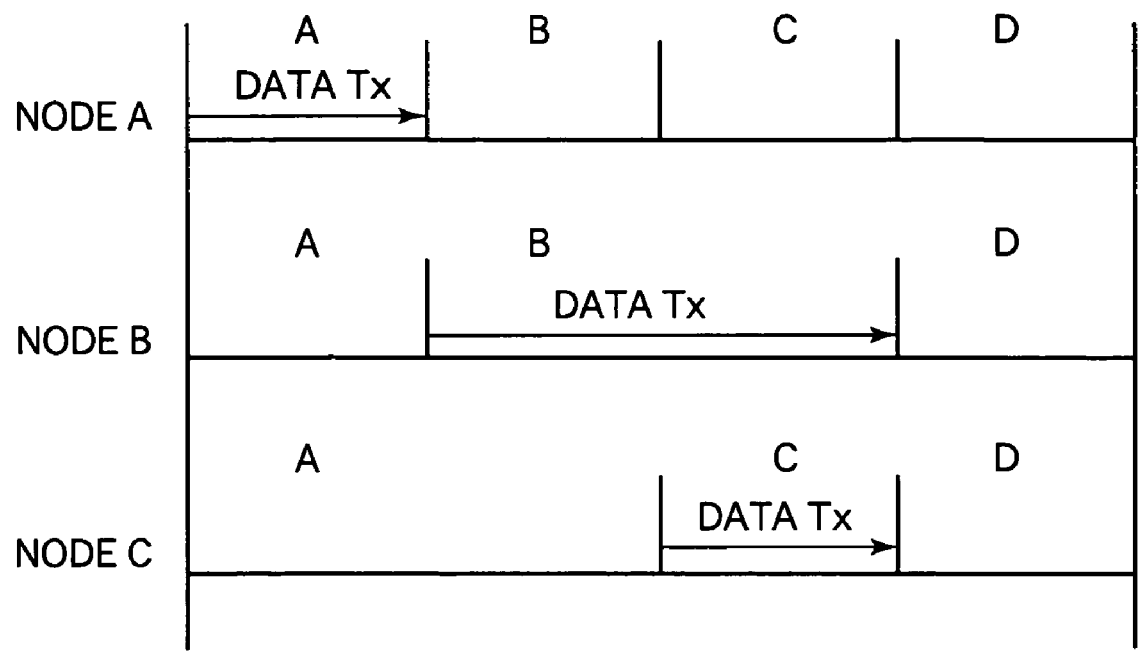
FIG. 5A illustrates the assignment of time slots before detection of a collision in the first embodiment.

FIG. 5A illustrates the time slot assignments as seen from nodes A, B, and C. The arrows marked 'DATA Tx' indicate time periods during which nodes A, B, and C transmit data. In the steady state, nodes A, B, C, and D transmit impulse signals at equally spaced intervals in ABCD order, but since there is an intervening obstacle 8 between nodes B and C, nodes B and C do not receive each other's impulse signals. Both nodes B and C therefore assume that the time slot in which they can transmit data extends up to the impulse signal transmitted by node D. If both nodes B and C use the full width of these time slots to transmit data to node A, their data signals will collide at node A during the time slot assigned to node C, and node A will be unable to receive the transmitted data.

One known method by which this hidden node problem can be overcome employs request-to-send and clear-to-send (RTS and CTS) signals. Before transmitting data, each node must send an RTS signal and receive a CTS reply. A drawback of the RTS-CTS method is that it entails additional network overhead and reduces throughput, especially when the RTS and CTS signals are transmitted on the same channel as the data signals.

The dummy communication timing calculator 13 and collision detector 16 in the first embodiment provide a different way to overcome the hidden node problem. In brief, each node determines whether data transmitted from other nodes have collided, and if a node detects a collision, the node inserts a dummy time slot at the timing of the collision to prevent subsequent collisions at the same timing.

The node operation in the first embodiment for solving the hidden node problem will be described below in six steps: transition to the steady state (step S1), collision detection (step S2); insertion of further impulse signals (step S3), further interaction (step S4), transmission of data signals (step S5), and transition to the normal state (step S6).

Step S1: Transition to the Steady State

Each node interacts with its neighboring nodes as described above, and begins transmission of data signals in its self-assigned time slot when the steady state has been reached. Each node can transmit a data signal for the duration of its own time slot: for example, from just after the transmission of an output impulse signal until just before the next node transmits an impulse signal.

Step S2: Collision Detection

The collision detector 16 uses the signals received from the receiving sections of the impulse signal communication unit 11 and data signal communication unit 15 to determine whether an incoming data signal has been transmitted beyond the boundaries of its time slot, using the time slot boundaries recognized at the collision detector's own node. If reception of a data signal from another node fails to end before reception of the next impulse signal, the collision detector 16 recognizes a collision at the timing of that impulse signal. In FIG. 5A, since node A continues receiving the data signal transmitted from node B even after receiving the impulse signal transmitted from node C, the collision detector 16 in node A detects a collision, and stores the reception timing of the impulse signal from node C as the timing of the collision.

Collision detection may be suspended, however, for time slots in which data signals are not received. In FIG. 5A, if node C is not transmitting data, then even if node B transmits data in node C's time slot, node A may ignore the time-slot overrun and decide that no collision has occurred. A time slot in which a data signal is not received can be recognized by measuring the transmission of data signals over a plurality of timing phase cycles and, if no data signal transmission is found in a particular time slot during these cycles, recognizing the corresponding node as a node from which data signals are not being received.

When impulse signals and data signals are transmitted on different channels (at different carrier frequencies, for example), the collision detector 16 detects collisions as described above. If impulse signals and data signals are transmitted on the same channel, since the steady-state decision unit 14 can predict the coming impulse signal reception timings, the collision detector 16 uses the predicted reception timings, which are stored in the steady-state decision unit 14, instead of timings reported by the receiving section of the impulse signal communication unit 11, and detects a collision if the reception of a data signal extends over the predicted reception timing of the next impulse signal. A collision can then be detected even if the impulse signal communication unit 11 fails to detect the next impulse signal because it is masked by the data signal.

More generally, a collision may be detected when the duration of a data signal exceeds the length of the interval between the impulse signal transmitted by the node that transmitted the data signal and the next received impulse signal.

Because, as shown in FIG. 1, nodes B and C do not receive each other's impulse signals, the phase difference between their impulse signals has a tendency to decrease to a value near zero. Collisions can accordingly also be detected by establishing a guaranteed minimum time slot width, and recognizing a collision if the width of a time slot assigned to a node from which a data signal is received is less than this minimum width.

Step S3: Insertion of Further Impulse Signals

When the collision detector 16 at a node detects a collision, the dummy communication timing calculator 13 at that node starts operating, performing the same operation as the communication timing calculator 12, causing the node to transmit dummy impulse signals. A dummy impulse signal is a timing signal similar to an impulse signal. The first dummy impulse signal is transmitted at a point in the timing cycle that derives from the collision position that was stored when the collision was detected. In FIG. 5A, for example, node A may transmit its first dummy impulse signal just before receiving the next impulse signal transmitted from node C after the collision. More generally, node A may transmit its first dummy impulse signal at any point within what node A recognizes as the time slot assigned to node B.

Step S4: Further Interaction

Interaction continues, the dummy impulse signals being treated as if they had been transmitted by a separate node. After commencing transmission of dummy impulse signals, a node transmits two impulse signals per timing cycle, one impulse signal being its own basic impulse signal transmitted at the timing calculated by the communication timing calculator 12, the other being a dummy impulse signal transmitted at the timing calculated by the dummy communication timing calculator 13.

In the continuing interaction, the dummy communication timing calculator 13 treats the basic impulse signals transmitted by its own node as if they were impulse signals from another node, and the communication timing calculator 12 treats the dummy impulse signals transmitted by its own node if they were impulse signals from another node.

Step S5: Transmission of Data Signals

Figure 5B:
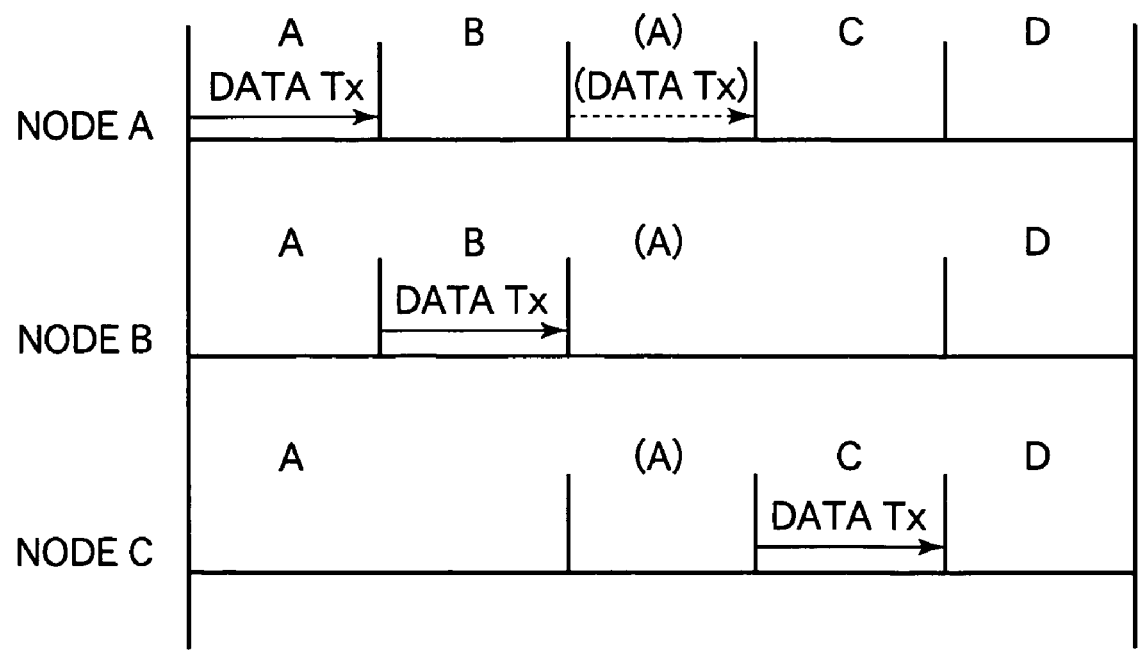
FIG. 5B illustrates the assignment of time slots after detection of a collision in the first embodiment.

When a new steady state has been reached, each node resumes transmission of data signals. If the dummy impulse signals transmitted from node A are initially inserted just before the impulse signals transmitted from node C in the time slot assignments shown in FIG. 5A, then when the new steady state has been reached, the time slots will be arranged as shown in FIG. 5B. Node A has an additional time slot, inserted between the time slots assigned to nodes B and C, and may transmit data during this time slot, as indicated by the dotted arrow, while also transmitting data in its original time slot, preceding the time slot assigned to node B.

Although nodes B and C remain unaware of each other's impulse signals and time slots, both nodes B and C can now communicate with node A without having their data signals collide at node A. Similarly, nodes B and C can communicate with node D in the time slots shown in FIG. 5B without the occurrence of collisions.

Step S6: Transition to the Normal State

If the steady state is later lost because, for example, one of the nodes stops communicating or a new node (not shown) enters the network in the neighborhood of nodes A, B, C, and D, node A tentatively stops transmitting dummy impulse signals and interaction continues with node A transmitting only its basic impulse signal. When a new steady state is reached, transmission of data signals resumes in the newly assigned time slots, and if no collisions occur, data signal transmission continues in these time slots.

Even though the network may lack an explicitly designated administrative node, the first embodiment provides administrative functions in each node, and has the nodes assign their own time slots through interaction with their neighboring nodes. The first embodiment accordingly provides a robust network that will not be brought down by a malfunction at an administrative node. The network is also flexible: if the network configuration changes because a node is added, removed, or moved to another location, or if a node malfunctions, the nodes affected by the change can adjust their own time slot assignments autonomously, while nodes not affected by the change can continue to transmit data without changing their time slot assignments.

The network is also resilient in that if a node detects a collision between data signals received from two other nodes, the node takes action by transmitting dummy impulse signals that insert a dummy time slot between the time slots belonging to the two other nodes. Since both of the other nodes can receive the dummy impulse signals, they are forced to respect the dummy time slot and end the collision. The hidden node problem is thereby solved.

SECOND EMBODIMENT

In the above description of the operation of the first embodiment, only one node (node A) detected the collision between the data signals transmitted by nodes B and C. It is possible, however, that a plurality of nodes may detect the collision simultaneously and begin inserting dummy impulse signals at the same time, leading to a new steady state in which a plurality of nodes (e.g., both nodes A and D in FIG. 1) hold dummy time slots in each timing cycle. As a result, the time slot width is reduced more than is necessary to avoid the collision, and some nodes may find themselves without adequate time for data transmission. The second embodiment modifies the first embodiment to correct this situation.

Figure 6:
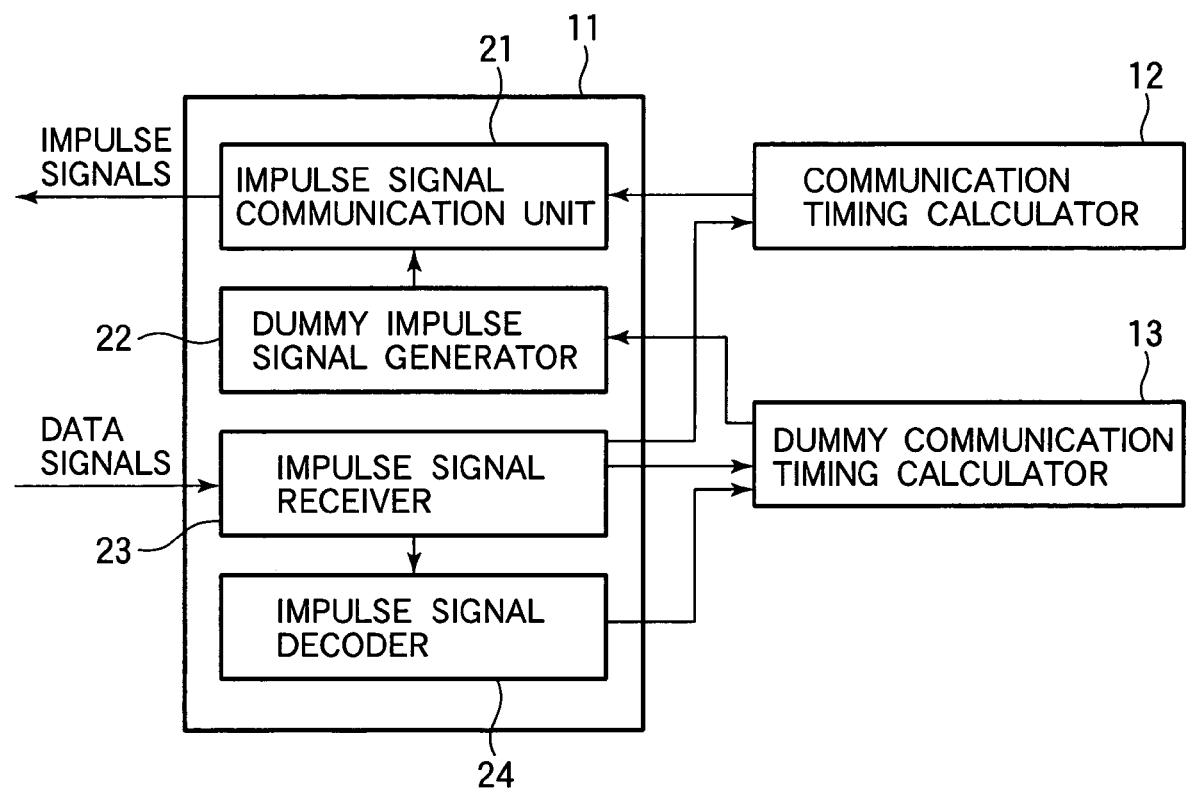
FIG. 6 shows details of the structure of a node in the second embodiment.

Although the node structure of the second embodiment is similar to the node structure of the first embodiment, the function of the impulse signal communication unit 11 in the second embodiment differs to some extent from the function of the impulse signal communication unit 11 in the first embodiment. FIG. 6 shows the internal structure of the impulse signal communication unit 11 in the second embodiment.

The impulse signal communication unit 11 in the second embodiment comprises an impulse signal transmitter 21, a dummy impulse signal generator 22, an impulse signal receiver 23, and an impulse signal decoder 24.

On receiving a request from the dummy communication timing calculator 13 for transmission of a dummy impulse signal, the dummy impulse signal generator 22 supplies a modulated impulse signal as a dummy impulse signal to the impulse signal transmitter 21, and the impulse signal transmitter 21 transmits the modulated dummy impulse signal. The impulse signal transmitter 21 accordingly transmits both basic impulse signals, on request from the communication timing calculator 12, and modulated dummy impulse signals received from the dummy impulse signal generator 22.

The impulse signal decoder 24 determines whether an impulse signal received in the impulse signal receiver 23 is a basic impulse signal or a modulated dummy impulse signal. Acting on the decision of the impulse signal decoder 24, the impulse signal receiver 23 supplies received basic impulse signals or signals indicating reception of a basic impulse signal to the communication timing calculator 12 at the time of reception of the basic impulse signals, and supplies received dummy impulse signals or signals indicating reception of a dummy impulse signal to the dummy communication timing calculator 13 at the time of reception of the dummy impulse signals. Alternatively, the impulse signal decoder 24 itself may supply received dummy impulse signals or signals indicating the reception of a dummy impulse signal to the dummy communication timing calculator 13.

The dummy impulse signal generator 22 may add an identifier (ID) to a dummy impulse signal, and the impulse signal decoder 24 may decide whether a received impulse signal is a basic impulse signal or a dummy impulse signal by recognizing whether or not the received impulse signal has an ID. Alternatively, basic impulse signals and dummy impulse signals may be transmitted with different IDs at the time of the transmission, and whether a received impulse signal is a basic impulse signal or a dummy impulse signal may be determined from its ID.

As described above, in the second embodiment, basic impulse signals are distinguishable from dummy impulse signals. In readjusting time slots to avoid data collisions, each node operates differently depending on whether a received impulse signal is a basic impulse signal or a dummy impulse signal. The processing generally includes four steps: collision detection (step S11), transmission of dummy impulse signals (step S12), detection of a following dummy impulse signal (step S13), and suspension of transmission of dummy impulse signals (step S14).

Step S11: Collision Detection

The processing up to collision detection is similar to the processing (steps S1 and S2) in the first embodiment, so a detailed description will be omitted.

Step S12: Transmission of Dummy Impulse Signals

When the collision detector 16 at a node detects a collision, the node activates its dummy communication timing calculator 13, and the dummy communication timing calculator 13 sends a transmission request to the dummy impulse signal generator 22 at a point in the timing cycle that derives from the collision position that was stored when the collision was detected. The dummy impulse signal generator 22 modulates an impulse signal, and the impulse signal transmitter 21 transmits the modulated impulse signal to the network as a dummy impulse signal.

Figure 7A:
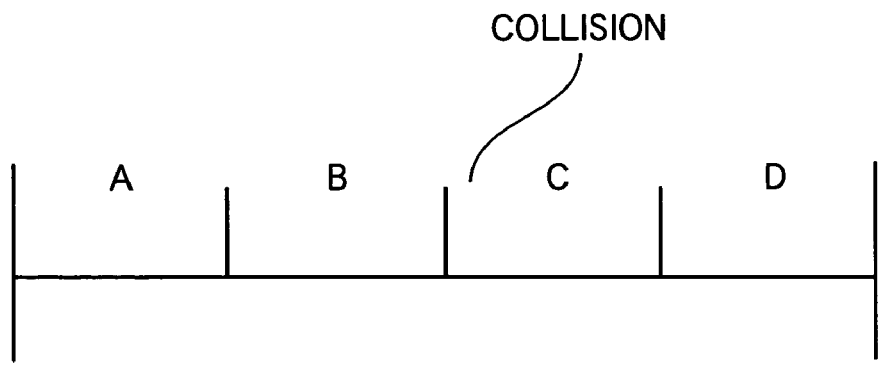
FIG. 7A illustrates the assignment of time slots before detection of a collision in the second embodiment.
Figure 7B:
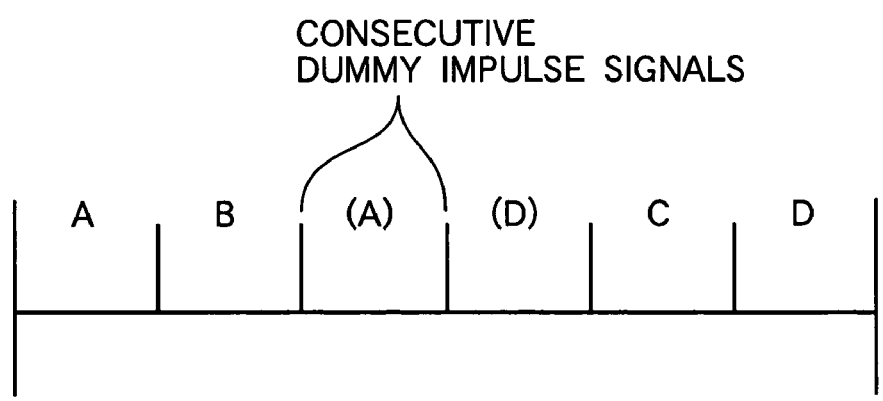
FIG. 7B illustrates the assignment of time slots when two nodes generate dummy impulse signals in the second embodiment.

In the network in FIG. 1, for example, in the initial steady state, nodes A and D see the time slot assignments shown in FIG. 7A, while nodes B and C see the time slot assignments indicated in FIG. 5A. Data signals transmitted from nodes B and C may accordingly collide at both nodes A and D, causing nodes A and D both to transmit dummy impulse signals. Nodes A and D thereby acquire dummy time slots, inserted between the time slots assigned to nodes B and C as shown in FIG. 7B, in which the dummy time slot assigned to node A is followed by the dummy time slot assigned to node D.

Step S13: Detection of a Following Dummy Impulse Signal

The impulse signal receiver 23 at a node receives impulse signals from the network, and supplies the received impulse signals to the impulse signal decoder 24. The impulse signal decoder 24 decodes the received impulse signals, and determines whether a received impulse signal is a dummy impulse signal. Received dummy impulse signals, or signals indicating reception of a dummy impulse signal, are supplied to the dummy communication timing calculator 13.

If the dummy communication timing calculator 13 receives a dummy impulse signal, or a signal indicating reception of a dummy impulse signal, as the next impulse signal received after it sends a transmission request, the dummy communication timing calculator 13 recognizes that the dummy time slot inserted by its own node is directly followed in the time slot sequence by a dummy time slot belonging to another node. In FIG. 7B, for example, node A's dummy time slot is followed by node D's dummy time slot. Node A's dummy impulse signal is therefore followed by node D's dummy impulse signal in the timing cycle, and this is detected by the dummy communication timing calculator 13 at node A.

Alternatively, the dummy communication timing calculator 13 may be adapted to detect that its own dummy impulse signal directly follows a dummy impulse signal received from another node in the timing sequence. In the present example, this would be detected by the dummy communication timing calculator 13 at node D.

It will be assumed below that node A detects the consecutive dummy impulse signals while node D does not.

Step S14: Suspension of Transmission of Dummy Impulse Signals

On detecting a following dummy impulse signal, the dummy communication timing calculator 13 at a node stops operating and is deactivated, and the node suspends transmission of dummy impulse signals.

Figure 7C:
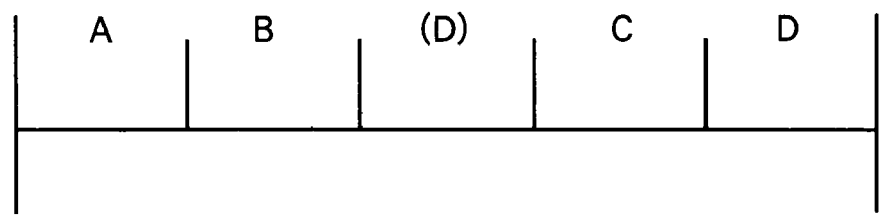
FIG. 7C illustrates the assignment of time slots after one of the two nodes stops generating dummy impulse signals.

In FIG. 7B, for example, before node A suspends transmission of dummy impulse signals, interaction takes place in six time slots, four time slots assigned to nodes A, B, C, D, and two additional time slots assigned to nodes A and D. After node A suspends transmission of dummy impulse signals, node D continues transmission of dummy impulse signals, so interaction continues with five time slots as shown in FIG. 7C. In the steady state, the time slots in FIG. 7C are wider than the time slots in FIG. 7B.

The second embodiment has substantially the same effect as the first embodiment. Since dummy impulse signals are additionally distinguishable from basic impulse signals, however, the unnecessary assignment of consecutive dummy time slots to different nodes can be detected, and the number of dummy time slots can be reduced to the minimum necessary number, which is just one for the simplest case in which only two data signals collide. Minimizing the number of dummy time slots maximizes the width of each time slot.

THIRD EMBODIMENT

In the first and second embodiments described above, when data signals collide, dummy impulse signals are transmitted to eliminate the collision. In the third embodiment, data collisions are eliminated without transmission of dummy impulse signals.

Figure 8:
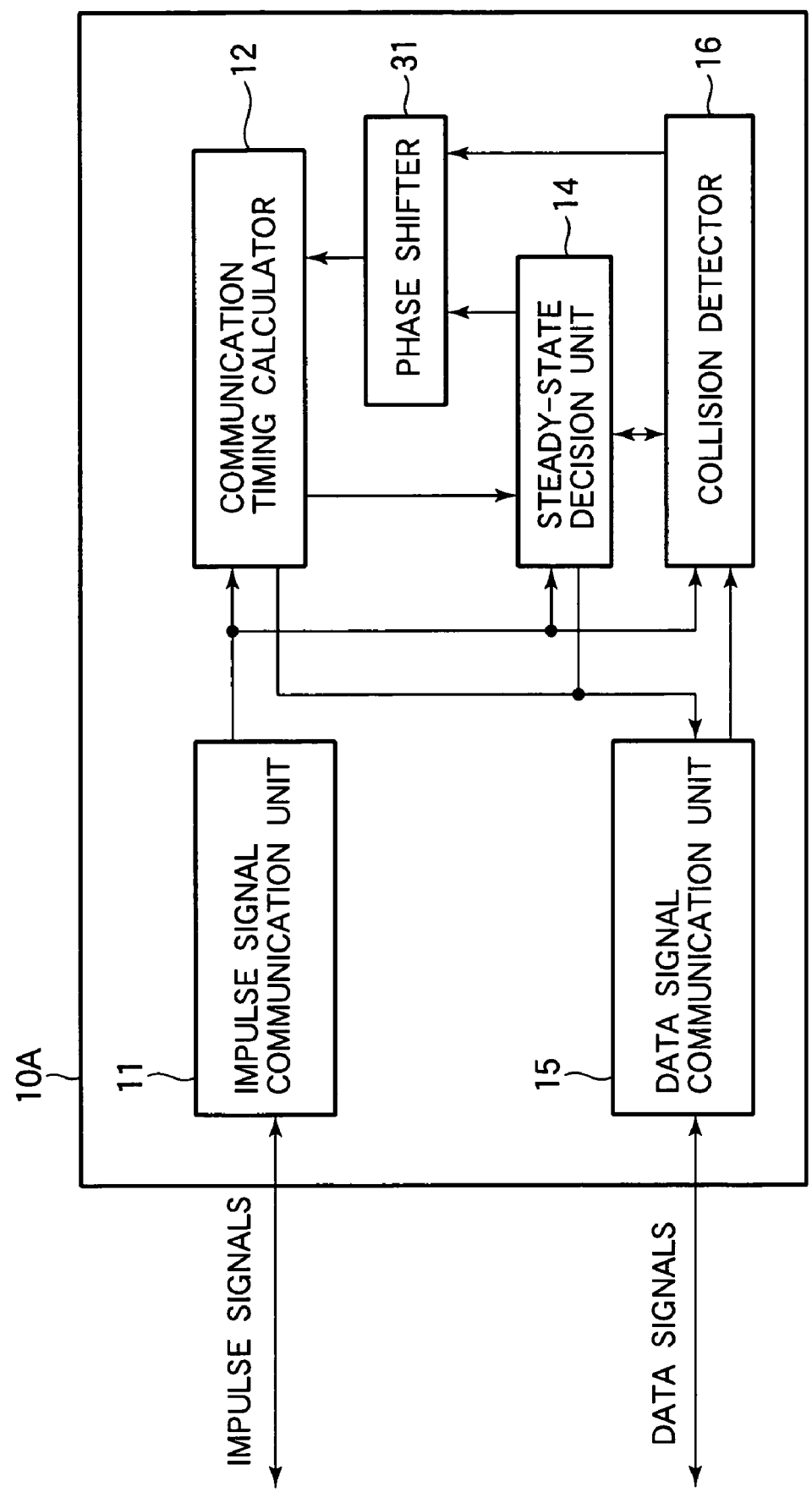
FIG. 8 is a functional block diagram showing the internal structure of a node in a third embodiment.

Referring to FIG. 8, a node 10A in the third embodiment comprises an impulse signal communication unit 11, a communication timing calculator 12, a steady-state decision unit 14, a data signal communication unit 15, a collision detector 16, and a phase shifter 31. The third embodiment differs from the first embodiment by including the phase shifter 31 instead of the dummy communication timing calculator 13. The impulse signal communication unit 11 in the third embodiment differs from the impulse signal communication unit 11 in the first embodiment by not having the function of transmitting dummy impulse signals.

The phase shifter 31 supplies a reset signal to the communication timing calculator 12, and has the function of resetting the interaction process.

Figure 9A:
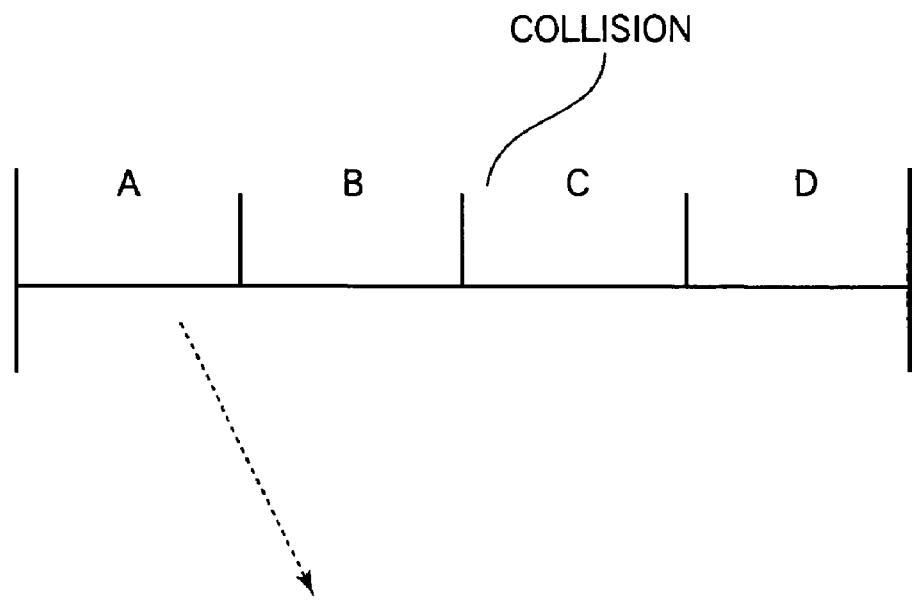
FIG. 9A illustrates the assignment of time slots before detection of a collision in the third embodiment.
Figure 9B:
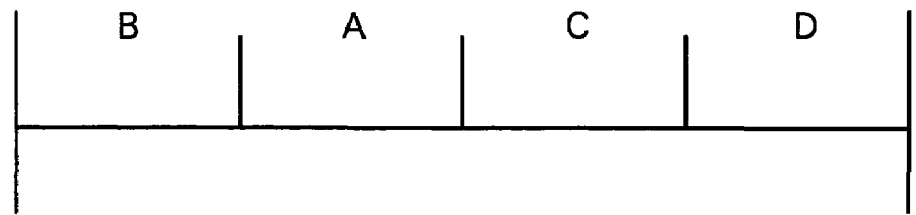
FIG. 9B illustrates the assignment of time slots after detection of a collision in the third embodiment.

Next, the operation of eliminating data collisions in the third embodiment will be described below with reference to FIGS. 8, 9A, and 9B. FIGS. 9A and 9B show time slot assignments as seen from node A in the network in FIG. 1.

The processing up to collision detection in the third embodiment is similar to the processing (steps S1 and S2) in the first embodiment, so a detailed description will be omitted.

When the collision detector 16 at a node detects a collision of data signals transmitted from other nodes, the phase shifter 31 stores the timing of the collision. At the next occurrence of this timing in the timing phase cycle, the phase shifter 31 resets the communication timing calculator 12, causing the node to stop transmitting impulse signals at the timing it was using until then and instead to start transmitting impulse signals at the timing of the collision. Following the reset, the node transmits one impulse signal per timing cycle.

When data signals transmitted from nodes B and C collide at node A at the boundary between the time slots assigned to nodes B and C in FIG. 9A, the phase shifter 31 at node A resets the communication timing calculator 12 so that it starts transmitting impulse signals at this boundary. Because of the random noise function φ(t), transmission may not start exactly at the boundary but at a point near the boundary. If transmission of node A's impulse signals starts at a point in node B's time slot, then when a new steady state is reached, the time slot assigned to node A will be inserted between the time slots assigned to nodes B and C, as shown in FIG. 9B, enabling transmission of data signals to continue without further collisions.

Even if transmission of node A's impulse signals starts at a point in node C's time slot, or if nodes A and D both detect the collision simultaneously and shift the timing of their impulse signals to the same point in the timing cycle, the random noise function φ(t) will tend to ensure that a collision-free steady state is reached in due time.

Both before and after the collision, the four nodes A, B, C, D divide the timing cycle into four time slots of equal width. The number of time slots is not increased, so the time slot width is not decreased.

Although dummy impulse signals are not transmitted, the third embodiment has substantially the same effect as the first embodiment. When a node detects a collision in the third embodiment, it shifts its time slot to a position between the two time slots at which the collision occurred and provides an impulse signal that both nodes that transmitted the colliding data signals can receive, thereby forcing those nodes to readjust their timing so as to avoid further collisions.

FOURTH EMBODIMENT

Figure 10:
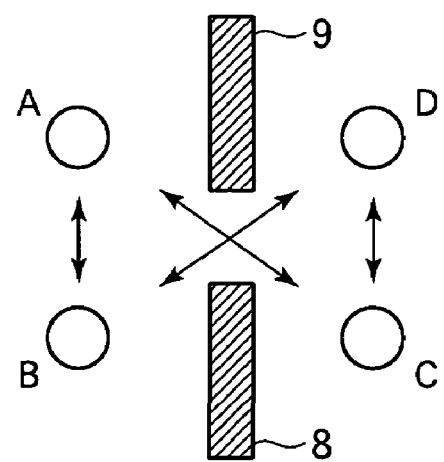
FIG. 10 shows a network to which the fourth embodiment applies.

Referring to FIG. 10, the communication system in the fourth embodiment is a network comprising four nodes A, B, C, D that transmit data and impulse signals to each other. Each pair of nodes can communicate with each other directly except for the pairs consisting of nodes A and D and nodes B and C, which are blocked by intervening obstacles 8, 9 from communicating directly.

Figure 11:
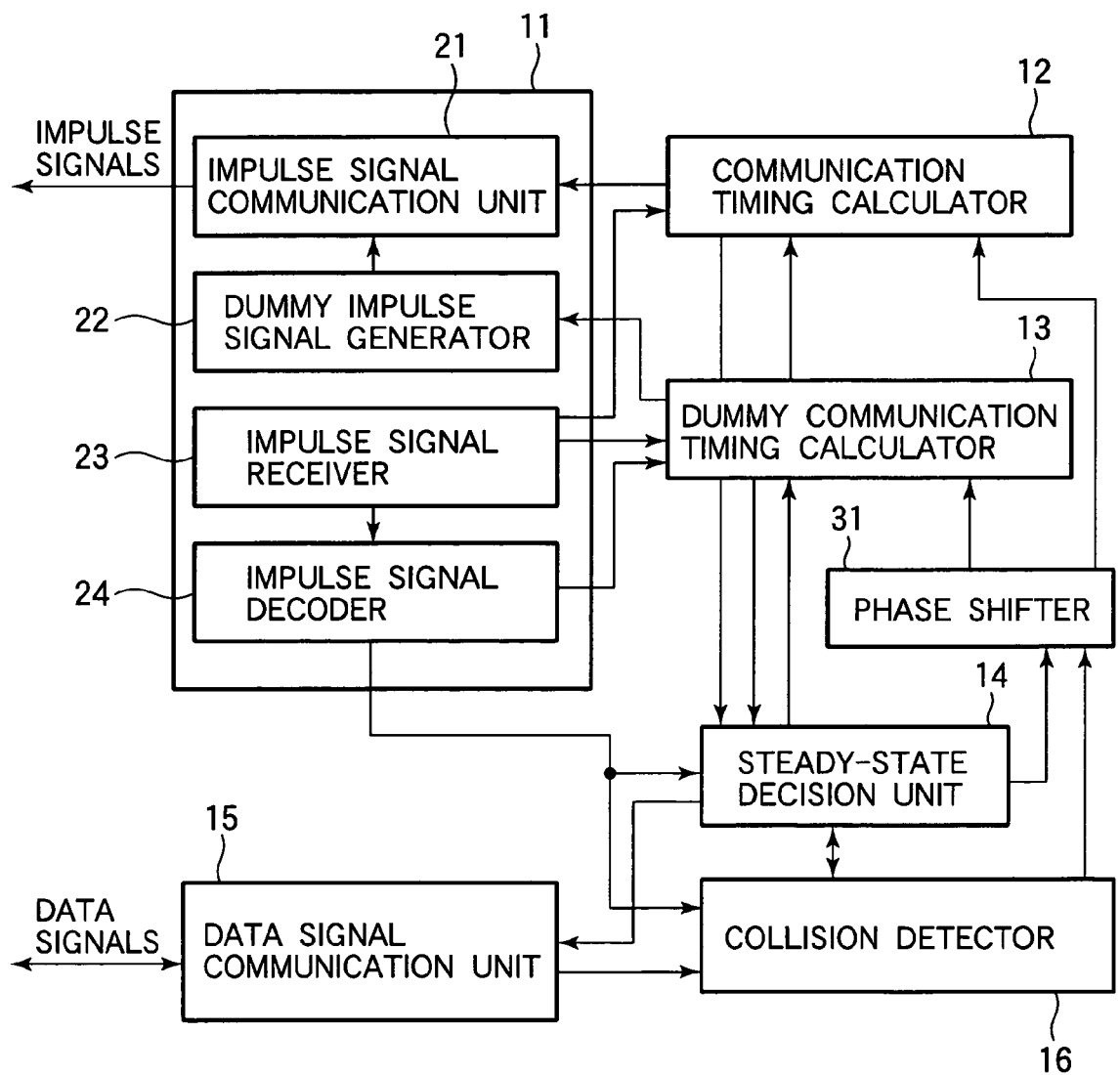
FIG. 11 is a functional block diagram showing the internal structure of a node in the fourth embodiment.

Referring to FIG. 11, the nodes 10B in the fourth embodiment are generally similar to the nodes in the first embodiment, but differ by including the impulse signal communication unit 11 of the second embodiment and the phase shifter 31 of the third embodiment. The dummy impulse signal generator 22 in the fourth embodiment modulates the dummy impulse signals it generates so as to indicate the node of origin. The constituent elements in the fourth embodiment are activated at different timings from the timings in the first, second, and third embodiments, as described below.

In the fourth embodiment, a node shifts the timing of its basic impulse signal when it receives a dummy impulse signal from another node directly after transmitting its basic impulse signal, the reason being that reception of the dummy impulse signal indicates the occurrence of a collision.

The operation of eliminating data collisions in the fourth embodiment will be described below in three steps: transmission of dummy impulse signals (step S21), detection of dummy impulse signals (step S22), and phase shift (step S23).

Step S21: Transmission of Dummy Impulse Signals

The processing up to transmission of dummy impulse signals is similar to the processing (steps S11 and S12) in the second embodiment. In the network in FIG. 10, for example, an initial stable state may be established with the phase relationship shown in FIG. 12A (or FIG. 7A). If data signals transmitted by nodes B and C collide at nodes A and D, nodes A and D begin transmitting dummy impulse signals as shown in FIG. 12B, leading to the time slot assignments shown in FIG. 13A.

Figure 12A:
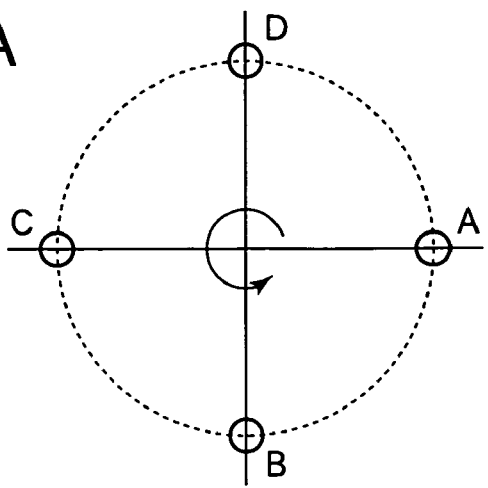
FIG. 12A illustrates a steady state in which the nodes in the fourth embodiment communicate without inserting dummy impulse signals.
Figure 12A:
Figure 12B:
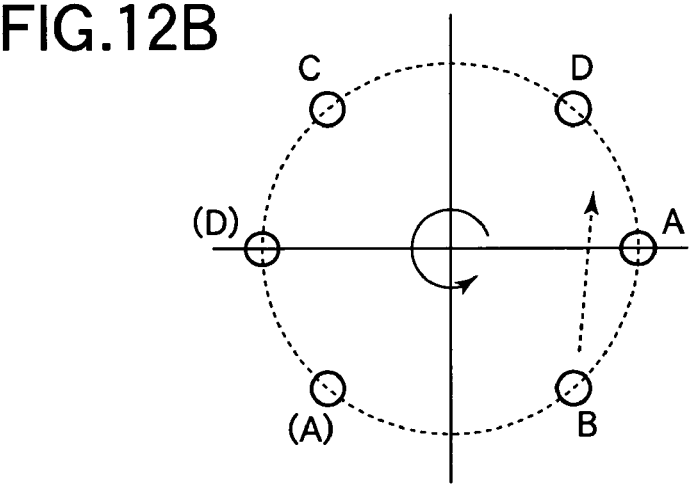
FIG. 12B illustrates the steady state after two of the nodes in the fourth embodiment begin inserting dummy impulse signals.
Figure 12B:
Figure 12C:
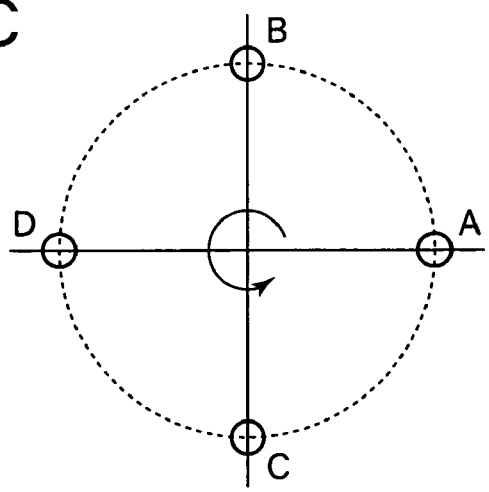
FIG. 12C illustrates the steady state after a phase shift in the fourth embodiment.
Figure 13A:
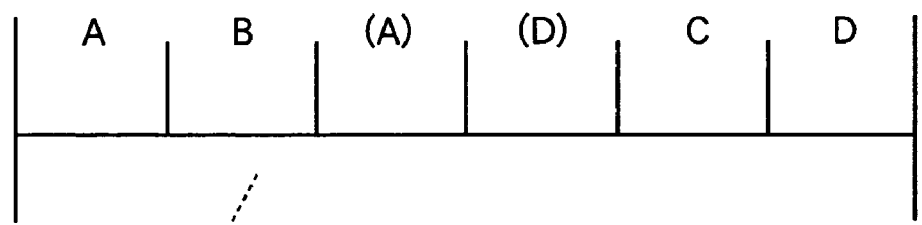
FIG. 13A illustrates the time slot assignment in FIG. 12B.
Figure 13B:
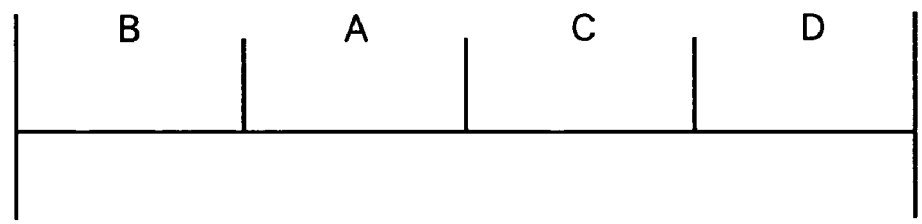
FIG. 13B illustrates the time slot assignment in FIG. 12C.

FIGS. 12A, 12B, and 12C show the phase relationships and FIGS. 13A and 13B show the time slot assignments in the network as a whole. No single node can see all of these phase relationship and time slot assignments.

In the state in FIG. 12A, for example, node A, being unaware of the presence of node D, assumes that its time slot occupies one-fourth of the timing cycle, node B's time slot occupies one-fourth of the timing cycle, and node C's time slot occupies one-half of the timing cycle. Node B, being unaware of the presence of node C, assumes that its own time slot occupies one-half of the timing cycle, node A's time slot occupies one-fourth of the timing cycle, and node D's time slot occupies one-fourth of the timing cycle. Similarly, node C assumes that node A's time slot occupies one-half of the time cycle, and node D assumes that its own time slot occupies one-half of the timing cycle.

Since nodes A and D cannot receive each other's basic impulse signals and dummy impulse signals, their data signals may collide even in the state in FIG. 12B, when time slots are assigned as in FIG. 13A. Furthermore, since nodes A and D are unaware that node D's dummy impulse signals directly follow node A's basic impulse signals in the impulse signal transmission sequence, nodes A and D do not suspend transmission of their dummy impulse signals.

Step S22: Detection of Dummy Impulse Signals

Even a node not transmitting dummy impulse signals, however, detects the reception of a dummy impulse signal after transmitting its own basic impulse signal. In FIGS. 12B and 13A, node B detects the reception of a dummy impulse signal from node A following the transmission of node B's basic impulse signal.

Step S23: Phase Shift

A node that detects a dummy impulse signal directly following its own basic impulse signal in the impulse signal transmission sequence shifts the phase of its impulse signals as in the third embodiment. As a result, the steady state is lost, the nodes that were transmitting dummy impulse signals stop doing so, and interaction continues with the nodes transmitting only their basic impulse signals. The node that shifts the phase of its basic impulse signal recommences the transmission of its basic impulse signal at a point in the timing cycle preceding the basic impulse signal transmitted from the node that transmitted the dummy impulse signal that directly followed the previous position of the shifted basic impulse signal.

In FIGS. 12B and 13A, for example, when node B finds that its basic impulse signal is directly followed in the impulse signal sequence by the reception of a dummy impulse signal from node A, node B shifts the transmission timing of its basic impulse signal to a timing preceding the transmission of node A's basic impulse signal, as indicated by the dotted arrow in FIG. 12B, and interaction resumes. The other nodes A, C, D detect loss of the steady state, and nodes A and D suspend the transmission of dummy impulse signals. Interaction continues with each node transmitting one basic impulse signal in each subsequent timing cycle. When a new steady state is reached, the time slot assignments are arranged as shown in FIG. 12C (FIG. 13B). Compared with the new steady state reached in the first or second embodiment, the width of each time slot is increased and each node finds itself with adequate time for data transmission.

The fourth embodiment combines features of all the preceding embodiments. As in the first embodiment, when a node detects a data collision, it inserts a dummy time slot between the colliding data signals. In addition, when the node owning the time slot directly preceding the inserted dummy time slot detects that its time slot is followed by a dummy time slot, it shifts its time slot to an earlier position in the time slot sequence. The dummy time slot is then no longer needed and is relinquished.

Like the second embodiment, the fourth embodiment tends to minimize the number of dummy time slots. In many cases, the number of dummy impulse signals is reduced to zero, as in the third embodiment, which maximizes the time slot width. An advantage of the fourth embodiment over the third embodiment is that the node that shifts the timing of its time slot is in general the node that caused the data collision, instead of the node that detected the data collision. This enables collisions to be avoided with less alteration of the time slot sequence.

In a variation of the fourth embodiment, when a node detects that its time slot is followed by a dummy time slot, and preceded by a time slot that is not a dummy time slot, the node shift the transmission timing of its basic impulse signal to a point preceding the timing of the preceding basic impulse signal, thereby interchanging the timing of its own time slot and the preceding time slot. This enables collisions to be avoided with minimum alteration of the time slot sequence, and the nodes of origin of impulse signals and dummy impulse signals do not have to be identifiable.

Further Variations

The second embodiment is a variation of the first embodiment, and the fourth embodiment is a combined variation of the first, second, and third embodiments, but further variations are possible, such as the following.

Although data signals collided because of intervening obstacles in the embodiments described above, a node cannot recognize the reason for a data collision; it simply operates so as to eliminate further collisions. The invention is accordingly effective in preventing data collisions regardless of the cause.

The present invention concerns the alteration of an autonomously established time slot sequence to avoid collisions between data signals. The method by which the time slot sequence is autonomously established is not limited to the use of impulse signals as described in the first embodiment; impulse signals may be used in other ways, or other types of state variable signals may be used, as described in the specification and drawings of Japanese Patent Application No. 2003-328530.

The present invention is applicable not only to wireless communication systems but also to wired communication systems.

Those skilled in the art will recognize that further variations are possible within the scope of the invention, which is defined in the appended claims.

What is claimed is:

1. A communication timing control apparatus provided in each of a plurality of nodes in a communication system, the communication timing control apparatus comprising:
a state variable signal communication unit for intermittently transmitting, to at least two other nodes in the communication system, an output state variable signal indicating an operating state or operating timing of its own node, and receiving, from the at least two other nodes in the communication system, input state variable signals indicating an operating state or operating timing of the at least two other nodes;
a timing decision unit for generating transitions in the operating state or operating timing of its own node, the transitions occurring at a basic transition rate, but at timings adjusted according to the input state variable signals;
a data signal communication unit for transmitting data from its own node in time slots responsive to timing of the transmission of the output state variable signal, and receiving data signals from the at least two other nodes;
a collision detector for detecting collisions between the data signals received from the at least two other nodes; and
a dummy communication timing decision unit for generating dummy transitions in the operating state or operating timing of its own node, the dummy transitions occurring at a basic transition rate, but at timings adjusted according to the input state variable signals and the output state variable signal, thereby causing the state variable signal communication unit to transmit a dummy output state variable signal between the input state variable signals received from a pair of nodes among the at least two other nodes when the collision detector detects a collision between data signals received from the pair of nodes, so that when the collision detector detects the collision, the state variable signal communication unit and data signal communication unit change transmission timings of the output state variable signal and the data, thereby changing the time slots.

2. The communication timing control apparatus of claim 1, wherein the collision detector detects the collision when a data signal received from one of the at least two other nodes is longer than an interval from the input state variable signal received from the one of the at least two other nodes preceding the data signal to a next input state variable signal received from another one of the two or more other nodes.

3. The communication timing control apparatus of claim 1, wherein the collision detector detects a collision when an interval between two input state variable signals received from two different nodes is shorter than a minimum guaranteed time slot width.

4. The communication timing control apparatus of claim 1, wherein the dummy output state variable signal is distinguishable from the output state variable signal.

5. The communication timing control apparatus of claim 4, wherein the dummy communication timing decision unit stops generating the dummy transitions in the operating state or operating timing of its own node if the transmission of the dummy output state variable signal is followed by reception of a dummy input state variable signal from another node before a further input state variable signal is received from any of the at least two other nodes.

6. The communication timing control apparatus of claim 4, further comprising a phase shifter for controlling the communication timing decision unit, wherein, when transmission of the output state variable signal is preceded by reception of a preceding input state variable signal and followed by reception of a dummy input state variable signal, the phase shifter causes the communication timing decision unit to shift the timings of the transitions in the operating state or operating timing of its own node to make the transmission of the output state variable signal precede the reception of the preceding input state variable signal.

7. The communication timing control apparatus of claim 1, further comprising a phase shifter for causing the communication timing decision unit to shift the timings of the transitions in the operating state or operating timing of its own node to a point causing the state variable signal communication unit to transmit an output state variable signal between the input state variable signals received from a pair of nodes among the at least two other nodes when the collision detector detects a collision between data signals received from the pair of nodes.

8. A communication node including the communication timing control apparatus of claim 1.

9. A communication system comprising a plurality of communication nodes, each communication node including the communication timing control apparatus of claim 1.

10. A method of controlling communication timing in a communication system having a plurality of nodes, the method comprising:
receiving, at an arbitrary node in the communication system, input state variable signals transmitted by at least two other nodes in the communication system, indicating an operating state or operating timing of the at least two other nodes;
generating transitions in the operating state or operating timing at the arbitrary node, the transitions occurring at a basic transition rate, but at timings adjusted according to the input state variable signals;
transmitting, from the arbitrary node, output state variable signals indicating the operating state or operating timing of the arbitrary node;
transmitting data signals from the arbitrary node in time slots responsive to timing of the transmission of the output state variable signals;
receiving data signals from the at least two other nodes;
detecting collisions between the data signals received from the at least two other nodes;
generating dummy transitions in the operating state or operating timing of the arbitrary node, the dummy transitions occurring at a basic transition rate, but at timings adjusted according to the input state variable signals and the output state variable signals, when a collision is detected between data signals received from a pair of nodes among the at least two other nodes; and
transmitting dummy output state variable signals responsive to the dummy transitions, thereby inserting a dummy time slot between the time slots in which the pair of nodes transmitted the colliding data signals, and changing timings of the transmission of the output state variable signals and the data and positions of the time slots, when the collision between the received data signals is detected.

11. The method of claim 10, wherein detecting collisions includes comparing a length of a data signal received from one of the at least two other nodes with a length of an interval from the input state variable signal received from the one of the at least two other nodes preceding the data signal to a next input state variable signal received from another one of the two or more other nodes, a collision being detected if the length of the data signal is greater than the length of the interval.

12. The method of claim 10, wherein detecting collisions includes comparing an interval between two input state variable signals received from two different nodes with a minimum guaranteed time slot width, a collision being detected when the interval is less than the minimum guaranteed time slot width.

13. The method of claim 10, wherein the dummy output state variable signals are distinguishable from the output state variable signals.

14. The method of claim 13, further comprising: detecting a consecutive pair of dummy time slots; and relinquishing one of the dummy time slots in the consecutive pair.

15. The method of claim 13, further comprising: exchanging positions of a pair of time slots directly preceding the dummy time slot; and relinquishing the dummy time slot.

16. The method of claim 10, further comprising shifting a time slot of the arbitrary node to a position between the time slots of the pair of nodes among the at least two other nodes when the collision is detected between the data signals received from the pair of nodes.

* * * * *

UNITED STATES PATENT AND TRADEMARK OFFICE
CERTIFICATE OF CORRECTION

PATENT NO. : 7,613,204 B2
APPLICATION NO. : 11/214903
DATED : November 3, 2009
INVENTOR(S) : Matsunaga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Nineteenth Day of October, 2010

David J. Kappos
*Director of the United States Patent and Trademark Office*